(12) United States Patent
Seller et al.

(10) Patent No.: US 12,206,537 B2
(45) Date of Patent: Jan. 21, 2025

(54) TRANSMITTER, RECEIVER, AND METHOD FOR CHIRP-MODULATED RADIO SIGNALS

(71) Applicant: Semtech Corporation, Camarillo, CA (US)

(72) Inventors: Olivier Bernard André Seller, Sainte-Soulle (FR); Christophe Jean Jacques Devaucelle, Boudevilliers (CH)

(73) Assignee: Semtech Corporation

( * ) Notice: Subject to any disclaimer, the term of this patent is extended or adjusted under 35 U.S.C. 154(b) by 70 days.

(21) Appl. No.: 18/206,943

(22) Filed: Jun. 7, 2023

(65) Prior Publication Data
US 2023/0412438 A1    Dec. 21, 2023

(30) Foreign Application Priority Data

Jun. 17, 2022  (EP) .................................... 22179559

(51) Int. Cl.
*H04L 27/26* (2006.01)
*H04B 1/69* (2011.01)

(52) U.S. Cl.
CPC ........... *H04L 27/2605* (2013.01); *H04B 1/69* (2013.01); *H04B 2001/6912* (2013.01)

(58) Field of Classification Search
CPC ..... H04L 27/2605; H04L 27/12; H04L 27/14; H04B 1/69; H04B 2001/6912; H04W 4/38

See application file for complete search history.

(56) References Cited

U.S. PATENT DOCUMENTS

| | | | |
|---|---|---|---|
| 8,249,190 B2* | 8/2012 | Seller | H04L 27/3405 375/267 |
| 9,252,834 B2* | 2/2016 | Seller | H03M 13/2721 |
| 9,577,702 B2* | 2/2017 | Seller | H04J 3/0667 |
| 9,647,718 B2* | 5/2017 | Seller | H04W 72/0446 |
| 9,794,095 B2* | 10/2017 | Sornin | H04W 88/16 |
| 10,001,555 B2* | 6/2018 | Seller | G01S 13/343 |
| 10,305,535 B2* | 5/2019 | Seller | H04B 1/69 |
| 11,310,085 B2* | 4/2022 | Seller | H04B 1/69 |
| 11,456,852 B2* | 9/2022 | Seller | H04L 1/0061 |

(Continued)

FOREIGN PATENT DOCUMENTS

| | | | | |
|---|---|---|---|---|
| CN | 104135305 A | * | 11/2014 | G01S 13/343 |
| CN | 105122080 A | * | 12/2015 | G01S 13/343 |

(Continued)

OTHER PUBLICATIONS

A. Tesfay et al., "Multiuser Detection for Downlink Communication in LoRa-Like Networks," in IEEE Access, vol. 8, pp. 199001-199015, 2020 (Year: 2020).*

(Continued)

*Primary Examiner* — Berhanu Tadese
(74) *Attorney, Agent, or Firm* — BLANK ROME LLP (57) ABSTRACT

A LoRa transmitter and corresponding receiver where the detection sequence in the preamble is phase-modulated and includes an information that encodes the position in the preamble, such as a countdown index. Nodes that wake up to receive a scheduled download can determine from this information how far the end of the detection sequence is and manage their energy consumption accordingly. The phase modulation is compatible with legacy devices.

14 Claims, 3 Drawing Sheets

(56) References Cited

U.S. PATENT DOCUMENTS

| | | | |
|---|---|---|---|
| 11,539,605 B2 * | 12/2022 | Latremouille | H04L 43/0823 |
| 2014/0225762 A1 * | 8/2014 | Seller | G01S 13/876 |
| | | | 342/125 |
| 2016/0094269 A1 * | 3/2016 | Seller | H04B 1/692 |
| | | | 375/139 |
| 2021/0184901 A1 * | 6/2021 | Seller | H04L 27/265 |
| 2021/0367752 A1 * | 11/2021 | Seller | H03M 13/33 |
| 2023/0412438 A1 * | 12/2023 | Seller | H04L 27/2605 |

FOREIGN PATENT DOCUMENTS

| | | | | | |
|---|---|---|---|---|---|
| CN | 106411467 A | * | 2/2017 | | H04L 1/0071 |
| CN | 107645465 A | * | 1/2018 | | G01S 11/026 |
| CN | 108599895 A | * | 9/2018 | | H04B 1/69 |
| CN | 106160784 B | * | 7/2019 | | G01S 5/021 |
| CN | 106411467 B | * | 11/2019 | | H04L 1/0071 |
| CN | 112953593 A | * | 6/2021 | | H04B 1/1638 |
| CN | 113726347 A | * | 11/2021 | | H03M 13/33 |
| CN | 114567394 A | * | 5/2022 | | H03M 13/3707 |
| CN | 112953593 B | * | 9/2022 | | H04B 1/1638 |
| CN | 117254997 A | * | 12/2023 | | H04B 1/69 |
| EP | 2763321 A1 | * | 8/2014 | | H03M 13/2721 |
| EP | 2767847 A1 | * | 8/2014 | | G01S 13/343 |
| EP | 2767848 A1 | * | 8/2014 | | G01S 13/343 |
| EP | 2449690 B1 | * | 1/2016 | | H04B 1/69 |
| EP | 2975814 A1 | * | 1/2016 | | H04B 1/69 |
| EP | 2767847 B1 | * | 4/2016 | | G01S 13/343 |
| EP | 3002884 A1 | * | 4/2016 | | H04B 1/69 |
| EP | 2767848 B1 | * | 4/2017 | | G01S 13/343 |
| EP | 3264622 A1 | * | 1/2018 | | H04B 1/69 |
| EP | 3002884 B1 | * | 4/2018 | | H04B 1/69 |
| EP | 3187898 B1 | * | 8/2018 | | G01S 13/343 |
| EP | 3264622 B1 | | 3/2019 | | |
| EP | 2763321 B1 | * | 4/2020 | | H03M 13/2721 |
| EP | 2975814 B1 | * | 9/2020 | | H04B 1/69 |
| EP | 3836409 A1 | * | 6/2021 | | H04B 1/04 |
| EP | 3917021 A1 | * | 12/2021 | | H03M 13/33 |
| EP | 4012933 A1 | * | 6/2022 | | H04B 1/1638 |
| EP | 4293922 A1 | * | 12/2023 | | H03M 13/33 |
| FR | 3108815 A1 | * | 10/2021 | | H04B 1/69 |
| WO | WO-2014124785 A1 | * | 8/2014 | | G01S 13/343 |

OTHER PUBLICATIONS

R. Correia et al., "Chirp Based Backscatter Modulation," 2019 IEEE MTT-S International Microwave Symposium (IMS), Boston, MA, USA, 2019, pp. 279-282 (Year: 2019).*

J.-M. Kang, "On the LoRa Modulation for IoT: Preamble Designs for Channel Estimation With Single- and Multi-Chirp Transmission Strategies," in IEEE Internet of Things Journal, vol. 11, No. 17, pp. 27981-27993, 1 Sep. 1, 2024, (Year: 2024).*

A. R. Jadhav and P. Rajalakshmi, "Enhanced LoRa Data Rate through Patch," 2020 IEEE 6th World Forum on Internet of Things (WF-IoT), New Orleans, LA, USA, 2020, pp. 1-6, (Year: 2020).*

* cited by examiner

Fig. 5 symbol number

Fig. 6 symbol number

TRANSMITTER, RECEIVER, AND METHOD FOR CHIRP-MODULATED RADIO SIGNALS

RELATED APPLICATION

The present application claims priority from European Patent Application 22179559.4 of Jun. 17, 2022, the contents whereof are hereby incorporated entirely.

TECHNICAL DOMAIN

The present invention concerns, in embodiment, receivers and transmitters for chirp-modulated, spread-spectrum radio signals.

RELATED ART

Wireless connected devices have been the object of considerable interest and effort in recent times. Improvement in wireless communication techniques are instrumental for the creation and the development of the "Internet of Things". In this context, several wireless communication protocols have been proposed and utilised. The LoRa® communication system, known among others by patent applications EP 2763321 A1, EP 3264622 A1, and EP 2449690 A1, among others, uses chirp spread-spectrum modulation to achieve long transmission ranges with low power consumption and complexity.

In the context of this disclosure, the wording "LoRa" indicates for brevity a communication system based on the exchange of radio signals that include a plurality of frequency chirps, each chirps being limited to a finite interval of time and an finite bandwidth, wherein the chirps include base chirps in which the frequencies follow a given function from the beginning to the end of the interval of time, and modulated chirps that are cyclical shifts of a base chirp. The base chirps and modulated chirps are taken as symbols in a modulation alphabet. This definition includes the known LoRa® products and standards, as well as possible and yet unimplemented variants of the broad concept.

LoRa® modulation is used in many applications and devices, both for Low Power Wide Area Networks and for long range point to point communication. Its increasing diffusion is supported by different vendors of the core technology in chipsets, modules, and reference designs. In many applications, the deployment consists in many sensor nodes, configured to perform a given measurement—such as the determination of a position, a temperature, . . . —, and one or more gateways that communicate with the sensor nodes and act as concentrators and coordinators. Sensor nodes may communicate with the gateway or gateways by LoRa-modulated radio transmissions in both directions. In addition, some devices act as relays between gateways and sensor nodes. Such relays are typically battery operated, have power consumption constraints like sensor nodes and might include a sensor node function.

Relays and sensor nodes may spend most of the time in a low-power sleep state and wake up to listen for incoming messages during short time windows, to save energy. The listening windows are deterministically predictable to an extent, but the uncertainty can be considerable since sensor nodes and relays, in most cases, are incapable of keeping good time in sleep mode. To obviate this, gateways or nodes wishing to send a message or download data to such a node or relay should prepend the message with a very long preamble (up to a few seconds) of unmodulated chirps, to ensure that it will overlap the listening windows. A preamble of unmodulated chirps is a prescribed feature of LoRa frames, but its length is not fixed.

This solution is effective but, since the preamble is made by identical chirps, the listening device has no way of knowing when the preamble will end and, if it wakes up very early during the long preamble, will have to keep listening for the whole duration of the preamble, spending energy in the reception of a signal that conveys no useful information. A relay might be serving several sensor nodes, so minimizing this power consumption is important.

The present invention proposes an improved LoRa transmitter and receiver that overcome the above limitations. The same solution is applicable to other chirp-based radio network.

SHORT DISCLOSURE OF THE INVENTION

An aim of the present invention is the provision of a transmitter, a receiver, and a method of downloading data that overcome the shortcomings and limitations of the state of the art.

According to the invention, these aims are attained by the object of the attached claims and in particular by a transmitter for chirp-modulated radio signals comprising a modulator configured to generate a radio signal that includes a plurality of chirps, each chirp being limited in time between an initial instant at which the signal has an initial instantaneous frequency and a final instant at which the signal has a final instantaneous frequency, whereby the modulator is configured to generate base chirps, in which the frequency changes monotonically from the initial instantaneous frequency to the final instantaneous frequency according to a predetermined base chirp function, and modulated chirps, whose instantaneous frequency vary according to a plurality of functions that are cyclic shifts of the base chirp function, the transmitter being configured to organize chirps in frames having a preamble and a payload comprising a set of modulated chirps carrying an element of information encoded as cyclic shift, wherein the preamble comprises a succession of base chirps, characterized in that chirps of the preamble have a phase shift encoding a position in the preamble.

The invention relates also to a receiver device designed to cooperate with the transmitter and receive the chirp-modulated radio signals organized in frames defined above. The receiver detects the preamble, determines phase shifts of chirps in the preamble and, on the assumption that the phase shifts encode a position in the preamble according to a predefined encoding, enters a low-power state and/or a listening state during a period dependent on said position in the preamble.

By inserting variable sleep times in the preamble, the receiver of the invention can conserve power without losing important information. The last symbols of the preamble are used in LoRa for frame, time and frequency synchronization and, preferably, the receiver remains in the low-power state during most of the remaining duration of the preamble and wake up shortly before synchronization symbols of the preamble.

Advantageously, the transmission format of the invention is compatible with legacy LoRa receivers that do not attempt to determine a phase shift in preamble symbols. These receivers can detect phase-modulated LoRa symbols and synchronise with the phase-modulated preamble of the invention without performance losses.

The receiver in the listening state can detect a second preamble of a second frame, possibly at a different spreading factor, enter a low/power state and/or into the listening state during a period dependent on said position in preamble. As disclosed above, the receiver wakes up preferably shortly before the synchronization symbols of either preamble.

The invention also comprises a method in which data are downloaded from a gateway or from a sensor node to a wireless device in a low-power vide-area network at a scheduled download time: when the wireless device enters a listening period, the gateway or sensor nodes generates a radio signal that includes one or more frames of chirps, as defined above, the wireless device detects a preamble, determines the phase shift of chirps in the preamble and, assuming that they encode a position in the preamble, enters a low-power state or a listening state during a period dependent on said position in preamble.

Dependent claims relate to important and useful features that are not however essential, such as for example a differential encoding rule of the phase shift in which the chirps in the detecting sequence of the preamble are combined in groups, and the phase shift in each group follow a pattern whose amplitude changes from one group to another according to a predefined law and the preamble ends at a position at which a value of the amplitude reaches a predefined value that can be zero. The law can be a linear one, either decreasing or increasing, or a sawtooth law, or any other suitable deterministic function. Each group could include two chirps of equal and opposite phase shift, three chirps in which the first and the last have opposite phase shift and the central one has zero shift, or other combinations of chirps.

The phase shifts can also encode additional information, such as a designation of a network or a data stream to which the payload belongs. This can be obtained by selecting different sequences for the phase shift in a predefined set. A useful possibility is encoding the additional information in the slope of the variation of the phase shift.

SHORT DESCRIPTION OF THE DRAWINGS

Exemplar embodiments of the invention are disclosed in the description and illustrated by the drawings in which.

EXAMPLES OF EMBODIMENTS OF THE PRESENT INVENTION

Figure 1:
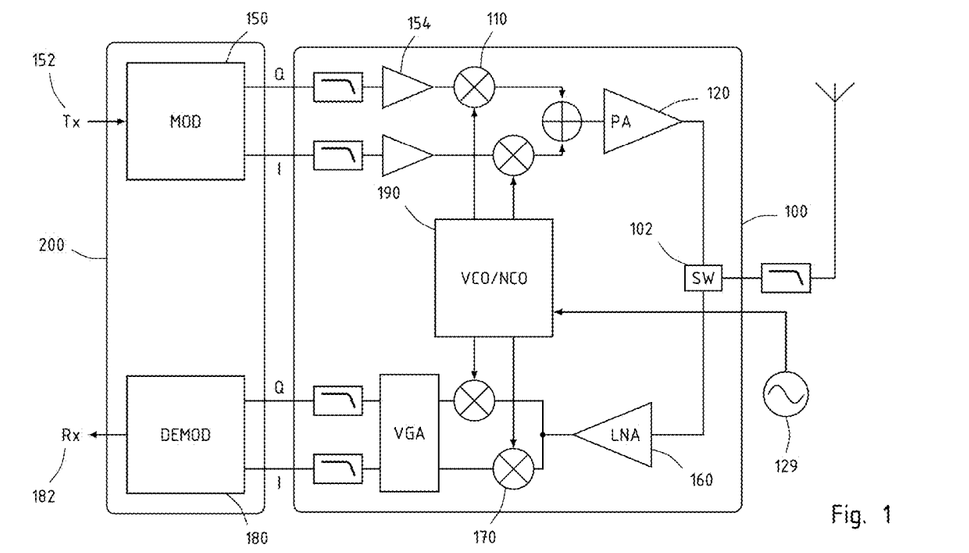
FIG. 1 shows, in schematic simplified fashion, the structure of a radio modem according to one aspect of the present invention.

Several aspects of the chirp modulation technique employed in the present invention are described in European Patent EP 2449690 B1, which is hereby incorporated by reference, and will be reminded here summarily. The radio transceiver that is schematically represented in FIG. 1 is a possible embodiment of the invention. The transceiver includes a baseband section 200 and a radiofrequency section 100. It includes a baseband modulator 150 that generates a baseband complex signal based on the digital data 152 at its input. This is then converted to the desired transmission frequency by the RF section 100, amplified by the power amplifier 120, and transmitted by the antenna through the RF Switch 102.

Once the signal is received on the other end of the radio link, it is processed by the receiving part of the transceiver of FIG. 1 that comprises a low noise amplifier 160 followed to a down-conversion stage 170 that generates a baseband signal (which is again a complex signal represented, for example by two components I, Q comprising a series of chirps, then treated by the baseband processor 180, whose function is the reverse of that of the modulator 150, and provides a reconstructed digital signal 182.

As discussed in EP2449690, the signal to be processed comprises a series of chirps whose frequency changes, along a predetermined time interval, from an initial instantaneous value $f_0$ to a final instantaneous frequency $f_1$. It will be assumed, to simplify the description, that all the chirps have the same duration T, although this is not an absolute requirement for the invention.

The chirps in the baseband signal can be described by the time profile f(t) of their instantaneous frequency or also by the function φ(t) defining the phase of the signal as a function of the time. Importantly, the processor 180 is arranged to process and recognize chirps having a plurality of different profiles, each corresponding to a symbol in a predetermined modulation alphabet.

Figure 2A:
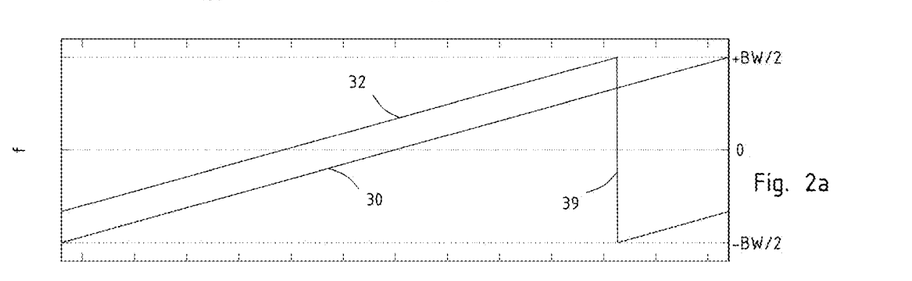
FIG. 2a plots the instantaneous frequency of a base chirp and of a modulated chirp according to one aspect of the invention. The phase of the same signals is represented in FIG. 2b, and FIG. 2c plots the real and of the complex component of the base chirp and of a modulated chirp, in the time domain, and in the baseband representation.
Figure 2B:
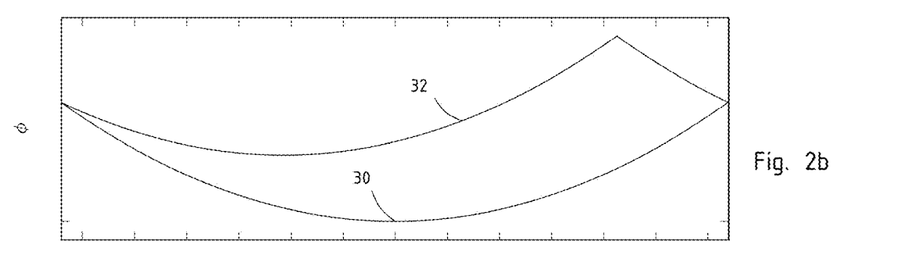
Figure 2C:
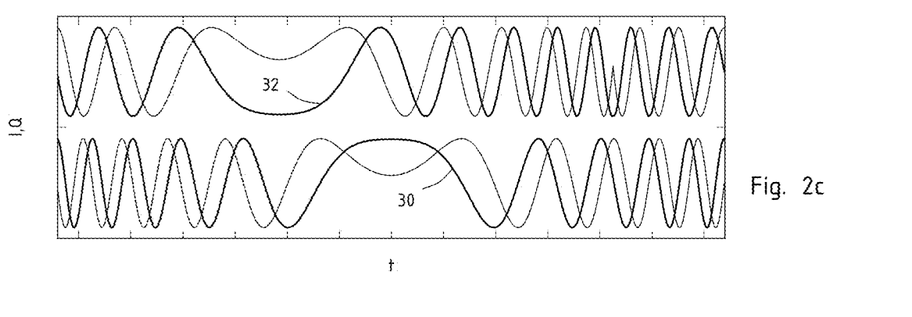

Importantly, the received signal Rx can comprise base chirp (also called unmodulated chirps in the following) that have specific and predefined frequency profile, or one out of a set of possible modulated chirps, obtained from base chirps by time-shifting cyclically the base frequency profile. FIGS. 2a and 2b illustrate, by way of example, possible frequency and phase profiles of a base chirp 30 and of one modulated chirp 32 between the time instant $t=t_0$ at the beginning of a chirp and the instant $t=t_1$ at the end of the chirp, while FIG. 2c shows the corresponding baseband signals in the domain of time. The horizontal scale corresponds for example to a symbol and, although the plots are drawn as continuous, they in fact represent a finite number of discrete samples, in a concrete implementation. As to the vertical scales, they are normalized to the intended bandwidth or to the corresponding phase span. The phase is represented in FIG. 2b as if it were an unbounded variable, but it may in fact span across several revolutions in a concrete implementation.

In the example depicted, the frequency of a base chirps changes linearly from an initial value −BW/2 to a final value BW/2 where BW denotes the bandwidth spreading, but descending chirps or other chirp profiles are also possible. In this example, the frequency rises: the base chirp is an up-chirp, but the opposite choice, from BW/2 to −BW/2, is also possible.

The information is encoded in the form of chirps that have one out of a plurality of possible cyclic shifts with respect to a predetermined base chirp, each cyclic shift corresponding to a possible modulation symbol. The processor 180 is configured to process a signal that comprises a plurality of frequency chirps that are cyclically time-shifted replicas of a base chirp profile, and extract or synthesize, according to whether the transceiver operates in transmission or in reception, a message that is encoded in the succession of said time-shifts.

The signal may include also conjugate chirps that are complex conjugate of the base unmodulated chirp. One can regard these as down-chirps, in which the frequency falls from BW/2 to −BW/2. Down-chirps may be symbol of their own right, the modulation alphabet including both up-chirps and down-chirps, or serve special purposes, for example for synchronization. Conventionally, LoRa uses down-chirp for special purposes only, but this is not a requirement.

The operation of evaluating a time shift of a received chirp with respect to a local time reference may be referred to in the following as "dechirping" and can be carried out advantageously by a de-spreading step that involves multiplying the received chirp by a complex conjugate of a locally generated base chirp, sample by sample. This produces an oscillating digital signal whose main frequency can be shown to be proportional to the cyclic shift of the received chirp. The demodulation may involve then a Fourier transform of the de-spread signal. The position of the maximum of the Fourier is a measure of the cyclic shift and of the modulation value. In mathematical terms, denoting the k-th received symbol with $S_j^k$, the corresponding modulation value is given by $m(k)=\arg\max_n(|X(k,n)|)$ where $X(n,k)=\mathcal{F}(S_j^k \cdot \bar{b}_j)$ denotes the Fourier transform of the product between $S_j^k$ and the conjugate of a base chirp $\bar{b}_j$. Other manners of demodulating the signal and extracting the cyclic shift of each symbol are possible, however.

Normal LoRa demodulation does not require an explicit extraction of the phase values represented in the plot of FIG. 2b. The present invention concerns an advantageous schema of signalling additional information in the phase of the chirps. To this purpose, the phase of the chirp symbol can be computed as a time series of digital values from the received signals $S_j^k$ with known techniques.

The signal transmitted and received by the invention are organised in frames that include a preamble and a data section, suitably encoded. The preamble and the data section comprise a series of chirps modulated and/or unmodulated, that allows the receiver to time-align its time reference with that of the transmitter, retrieve an element of information, perform an action, or execute a command.

As disclosed in EP2449690 and EP2763321, including a preamble of identical preferably unmodulated chirps is advantageous for the detection. The device receiving this signal applies the dechirping process described above and look for a peak in the FFT spectrum above the noise. The detection of the peak tells the receiver that a LoRa signal has been received, and the position of this peak indicates a timing and frequency offset that exists between the transmitter and receiver system. To enhance sensitivity, the receiver may be configured to add the FFT output of several consecutive identical chirps in the preamble, either coherently or incoherently.

As disclosed in EP2763321, the receiver may be configured to improve the time and frequency synchronization by looking at other special features of the preamble, such as symbols having a predetermined value of cyclical shift, and conjugate (descending) symbols. The receiver may be configured also to improve the synchronization figures by comparing the FFT peak resulting from different symbols spaced apart in time.

In the frame of the present invention, the receiver is configured to determine the timing error making use of the method disclosed in the cited references and track the timing and/or frequency error along the data frame, or at least along the preamble, and track them by a suitable tracking algorithm. The reception may be further improved through the application of a systematic offset to the synthesized chirps based on the estimated crystal error.

Figure 3:
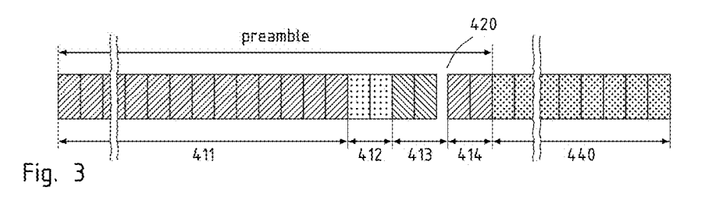
FIG. 3 shows an example of a LoRa frame to which the invention can be applied.

FIG. 3 represents schematically a frame structure that can be employed in various aspects of the present invention. In the presented example, the frames have a preamble including a detect sequence 411 of base (i.e., un-modulated, or with cyclic shift equal to zero) symbols. The detect sequence 411 is used in the receiver to detect the beginning of the signal and, preferably, perform a first synchronisation of its time reference with the time reference in the transmitter. By demodulating the detect sequence, the receiver can determine a shift amount and adapt the frequency and phase of its clock with those of the sender, thus allowing the decoding of the following data. The detect sequence is followed, in the LoRa standard, by frame synchronization symbols 412, frequency synchronization symbols 413, a silence 420, fine synchronization symbols 414, and the data payload 440.

The length of the detect sequence 411 is not completely determined in the LoRa standard, and the receiver, upon detection of a sequence, is expected to decode all the incoming chirp to the end of the sequence. Since all the symbols in the detect sequence 411 are base chirps, the receiver has no way to tell whether the end of the detect sequence is near or far.

According to the invention, the transmitter inserts phase shifts into the chirps in the detect sequence 411 and the phase shifts encode an information about the position of a given chirp in the preamble. The receiver, when detecting the sequence 411 is configured to extract the phase shift, uses them to determine a remaining duration of the preamble and, knowing whether the end of the detect sequence is near or far in the future, take energy-saving measures.

The insertion of these phase shifts is compatible with standard (legacy) LoRa receivers that detect the sequence through an incoherent accumulation of the "dechirp" output. Since each phase shift is applied to a complete chirp symbol, the incoherent accumulation is insensitive to these phase shifts. Legacy receiver will detect and receive the phase modulated preamble of the invention without sensitivity loss.

In principle, many ways of encoding a position are available and could be used in the invention. At the beginning of a frame there is an undetermined frequency offset between the time base of the receiver and that of the transmitter. Supposing that the frequency is constant, which is a reasonable approximation for a short time span, the receiver will perceive, summed to the phase shifts inserted deliberately by the transmitter, a constant phase shift between successive symbols proportional to the frequency offset. A way to deal with this could be to use a differential modulation, such that the desired information is in the difference between phase shifts of two symbols close to each other, and/or choose the phase shifts inserted by the transmitter such that they have a predetermined and known mean value, possibly equal to zero, and the constant phase drift caused by the frequency offset can be subtracted.

Figure 4A:
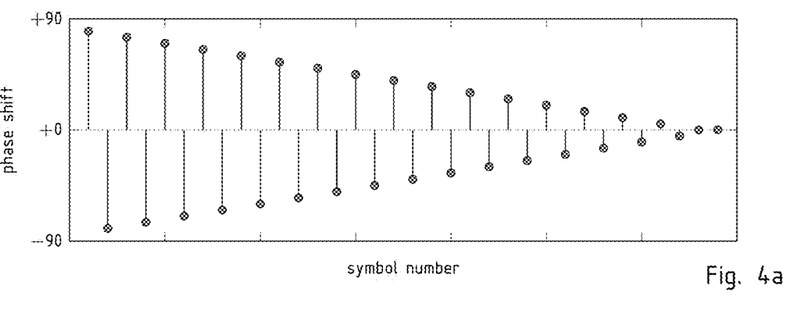
FIGS. 4a and 4b illustrate two possible schema of phase modulation applicable to the invention.

FIG. 4a shows a possible schema for the definition of the phase shifts. The shifts are organized in pairs of opposed values, for example a positive shift followed, in the immediately succeeding symbol, by a negative shift of equal magnitude. The receiver, when following the detect sequence, identifies pairs of symbols where the second phase shift is lower than the first one, and the difference between the phase shifts tells the distance to the end of the detect sequence. As the phase is not an unbound variable, there are limits to the amplitude of the phase shift that can be recognized by the receiver without ambiguity. Denoting with ±x the phase shifts inserted by the transmitter and with y the jump due to the frequency offset, 2x+y<360° must hold. Since y can assume any value, it must be x<90°. For some values of y, the receiver could see phase shifts larger than this maximum. In this case, the correct value can be recovered by adding 180°.

Figure 4B:
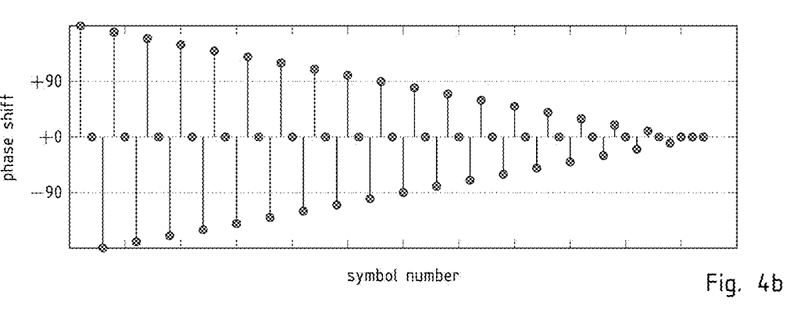

FIG. 4b is another example where the phase shifts are grouped in sets of three: a positive shift, a zero shift, and a negative shift opposed to the positive one. Again, the receiver can determine the position in the detect sequence from the phase spread in three successive chirps of the preamble where the phase of the third chirp is lower than that of the first one, and the phase of the second chirp has approximately the middle value.

In this case, the phase shifts inserted by the transmitter have the values (0, ±x) and the receiver can estimate x in two steps:

Finding the position of the zero in a generic triplet of chirps with phase jumps $x_0$, $x_1$, $x_2$. This is done by finding which of the expressions unwrap($x_0+x_2-x_1$), unwrap($x_1+x_0-x_2$), unwrap($x_2+x_1-x_0$) gives the minimum value, where unwrap( ) is a function returning a phase between ±180°.

Evaluate x=(unwrap($x_+-x_y$)−unwrap($x_--x_y$))/2 where $x_+$, $x_y$ and $x_-$ correspond to the phase jumps of the re-ordered triplet.

This pattern leaves a wider choice of phase shifts to the transmitter, because all the values of x except for 180° can be identified unambiguously at the receiver's side, no matter the frequency mismatch y. The re-ordering is ambiguous when x is 0°, 120° or 240°, but this has no effect on the result.

Through either of the differential modulations of FIG. 4a or 4b, the transmitter can encode a value x in each pair, respectively triplet of chirps in the detection sequence 411 (FIG. 3) and the receiver can recover the series of the values x by looking at the phases of the received chirps. Receivers lacking the ability to determine the phase of each chirp can process the detection sequence in the usual way without ill consequences.

As seen in FIGS. 4a, 4b, the values of x form a sequence decreasing from a maximum to zero. They may be regarded as a countdown index that reaches zero at the end of the detection sequence, whereby the receiver can find out when the sequence will end and manage its power consumption accordingly. This is simple and attractive, but it is not the only possibility: the sequence could end at any predetermined value different from zero and could be a rising progression rather than a falling one. In general, the x values could follow any deterministic sequence known to the receiver. Some examples of these variants of the invention will be given in the following.

When the receiving conditions are difficult the value of x determined by the receiver will be affected by noise. This can be mitigated by averaging several symbols (a multiple of the pattern length). The receiver node can estimate the most probable value of x and its variance and set its wake-up time with a variance-dependent safety margin accordingly.

In wireless network, not all messages are necessarily of interest for all the nodes that can receive them, and it is advantageous to add an information signalling that they belong to certain predetermined streams of data. In standard LoRa frames, this information is encoded in a frame synchronization word (412 in FIG. 3) following the detection sequence 411. The receiving nodes may use this information to decide early whether to decode a given frame or not. According to an aspect of the invention, an information signalling the belonging to a given data streams is encoded in the choice of a sequence for the x values among a set of possible sequences, known to the receiver. In a practical implementation, which is not the only one, however, the predetermined sequences are linear progressions with different time slopes, and the time slope of the phase shifts is enough to determine to which stream a given frame belongs to.

Figure 5:
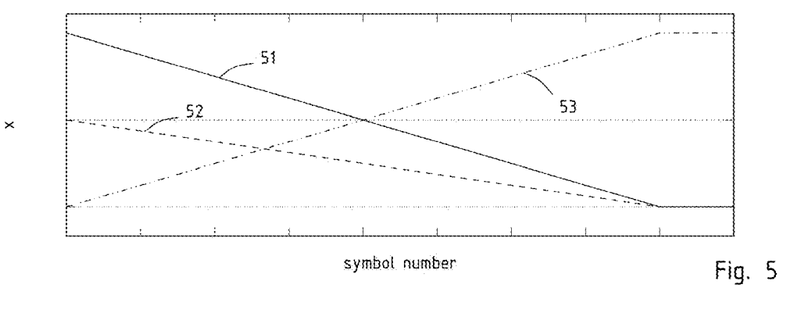
FIG. 5 shows how a network identification can be encoded in series of phase shifts having different slopes.

FIG. 5 shows, for example, three possible sequences 51, 52, 53 that can be used as identifiers to signal three data streams (also called networks, sub-networks or similar) in a WLAN. The amplitude of the x value is plotted against the symbol number, and the sequences can be distinguished by their slopes that are respectively −2a, −a, +2a.

Figure 6:
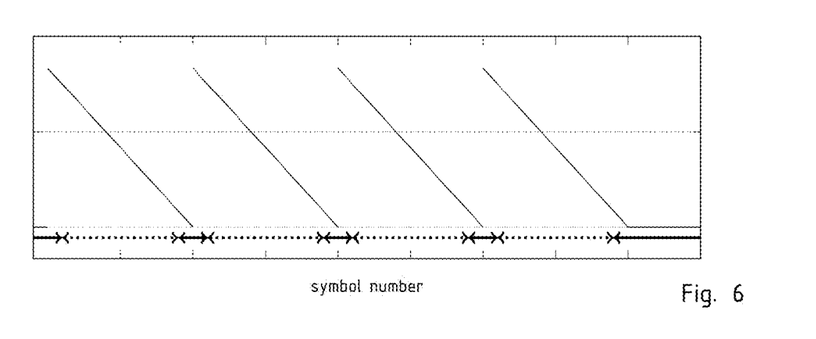
FIGS. 6 and 7 plots the modulation amplitude of the phase shift in two embodiments of the invention.

Preferably, the slope value should not go below a stated minimum value to allow a precise estimation of the end of the detection sequence even in presence of noise. This is particularly true for small spreading factors, where the symbols are short, and the number of chirps needed to cover a preamble of a couple of seconds is quite large. In this situation, a simple linear sequence would yield too small a slope, and it is advantageous to choose a different law. A possibility, which is illustrated in FIG. 6 is to repeat a shorter sequence multiple times, where the listening node can determine in advance the end of each sequence, enter a low-power state (dotted lines) and wake up in time to decode the end of the current sequence (solid lines) The listening node needs to listen only for a few symbols to realize whether the detection sequence is finished, and, despite the multiple cycles of sleep and wake, this may ultimately save more energy than having a very large uncertainty window on the end of the sequence.

Figure 7:
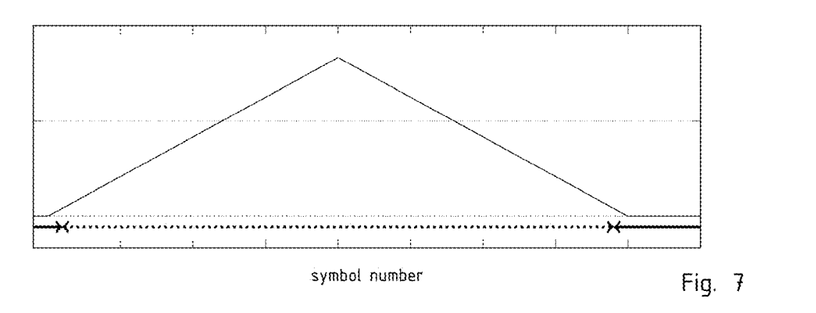

FIG. 7 shows another possibility to encode the position in the preamble through the phase. In this embodiment of the invention the amplitude x of the phase shifts follows a continuous triangle wave without the abrupt steps of the sawtooth presented above, and the slope changes from positive to negative. An advantage of this variant is that the slope is, in absolute value, twice as high than that of an asymmetric sawtooth of the same duration. FIG. 7 shows a single oscillation from a minimum to a maximum and back to the initial value, but multiple oscillations are also possible.

Figure 8:
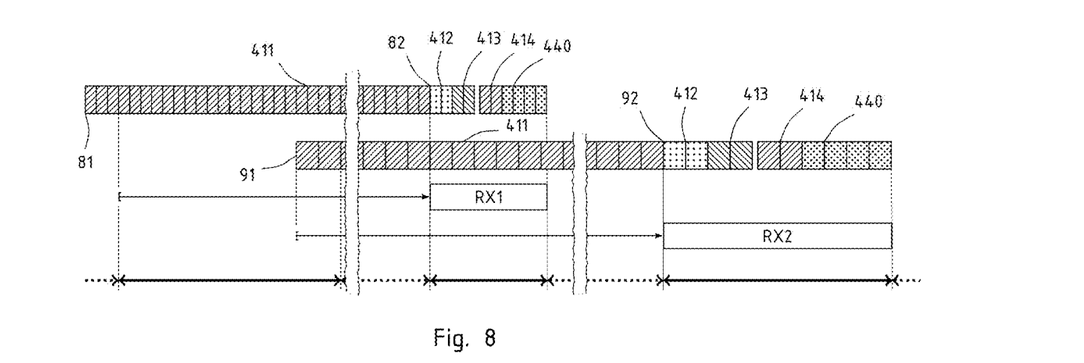
FIG. 8 shows a succession of steps in an example of the invention.

Besides sleeping to conserve energy, the receiving node, once it has determined the end of a preamble, is free to do other tasks, such as listening for other frames in other spreading factors (that can be received without interference). This allows the detection of overlapping frames at no hardware cost. FIG. 8 illustrates this situation: the receiving node identifies a first frame 81 and determines the time 82 when the detection sequence 411 of the preamble will end. Then the same node listens for other frames, detects frame 91 and determines that the end of its detection sequence 411 will fall at time 92. The invention can work with frames having different length and symbol rate, as it is expected for LoRa transmissions with diverse spreading ratios and/or modulation widths. Finally, the node enters in a low-power mode (dotted line) until time 82, to receive the synchronising symbols 412, 413, 414 and the payload 440 of frame 81, enter again in a low-power mode until time 92 to receive the synchronising symbols 412, 413, 414 and the payload 440 of the second frame 92.

REFERENCE SYMBOLS IN THE FIGURES 30 base chirp
32 modulated chirp 39 frequency jump
51 first slope example
52 second slope example
53 third slope example
61 phase error with timing error
62 phase error with timing and frequency error
81 first frame
82 end of first preamble
91 second frame
92 end of second preamble
100 RF section
102 RF switch
110 Frequency conversion
120 Power amplifier
129 oscillator, timebase
150 modulator
152 digital signal to transmit
154 buffer
160 LNA
170 down-conversion stage
180 processor, demodulator
182 reconstructed digital signal
190 controlled oscillator
200 baseband section
411 detection sequence
412 frame synchronization word
413 frequency synchronization symbols
420 silence
414 fine synchronization symbols
440 data payload

The invention claimed is:

1. A transmitter for chirp-modulated radio signals comprising a modulator configured to generate a radio signal that includes a plurality of chirps, each chirp being limited in time between an initial instant at which the signal has an initial instantaneous frequency and a final instant (T1) at which the signal has a final instantaneous frequency, whereby the modulator is configured to generate base chirps, in which the frequency changes monotonically from the initial instantaneous frequency to the final instantaneous frequency according to a predetermined base chirp function, and modulated chirps, whose instantaneous frequency vary according to a plurality of functions that are cyclic shifts of the base chirp function, the transmitter being configured to organize chirps in frames having a preamble and a payload comprising a set of modulated chirps carrying an element of information encoded as cyclic shift, wherein the preamble comprises a succession of base chirps, characterized in that chirps of the preamble have a phase shift encoding their position in the preamble.

2. The transmitter of claim 1 wherein the rule comprises groups of successive base chirps and the phase shifts in each group follow a pattern of phase shifts having amplitude that changes from one group to another according to a predefined law and the preamble ends at a position at which a value of the amplitude reaches a predefined value that can be zero.

3. The transmitter of claim 2, wherein the law governing the amplitude of the phase shifts is a linear decrease or a linear increase or a triangle wave.

4. The transmitter of claim 3, wherein slope of the linear decrease or linear increase is such the amplitude of the phase shifts goes from a maximum value to zero and then again to the maximum value repeatedly.

5. The transmitter of claim 2, wherein the preamble comprises a final section where the phase shift is constant, whereby the final section preamble section comprises a frame synch word of modulated chirps.

6. The transmitter of claim 2, wherein each group comprises two chirps having equal and opposite phase shifts.

7. The transmitter of claim 2, wherein each group comprises three chirps of which the first and the last have equal and opposite phase shifts, and the central one has zero phase shift.

8. The transmitter of claim 1, wherein the phase shifts also encode a designation of a network or a data stream to which the payload belongs.

9. The transmitter of claim 8, wherein the network or data stream is signalled by a slope of the variation of the phase shift.

10. A receiver for chirp-modulated radio signals comprising a demodulator for demodulating a signal that includes a plurality of chirps, each chirp being limited in time between an initial instant at which the signal has an initial instantaneous frequency and a final instant at which the signal has a final instantaneous frequency, the chirps in the signal being organized in frames having a preamble and a payload, wherein the preamble comprises a succession of base chirps in which the frequency changes monotonically from the initial instantaneous frequency to the final instantaneous frequency according to a predetermined base chirp function, and wherein the payload comprises a set of modulated chirps, which have an instantaneous frequency that varies according to a plurality of functions that are cyclic shifts of the base chirp function, an element of information being encoded as cyclic shifts in the modulated chirps, characterized in that the receiver is configured to detect the preamble, determine phase shifts of chirps in the preamble, assume that the phase shifts encode a position of the corresponding chirp in the preamble according to a predefined encoding, enter a low-power state and/or a listening state during a period dependent on said position in the preamble.

11. The receiver of claim 10, further configured to determine a designation of a network or a data stream to which the element of information belongs based on the phase shifts and to decide whether to continue the reception or not according to the designation.

12. The receiver of claim 10, configured to detect, in the listening state, a second preamble of a second frame, determine phase shifts of chirps in the second preamble, assume that the phase shifts of chirps in the second preamble encode a position in the second preamble according to a predefined encoding, enter a low/power state and/or into the listening state during a period dependent on said position in the preamble and on said position in the second preamble.

13. A method of downloading data from a first device to a second device in a low-power wide-area wireless network comprising
 defining a scheduled download time,
 configuring the second device to enter a listening state when, according to a time reference of the second device, is the scheduled download time,
 generating in the first device a radio signal that includes one or more frames, each frame having a plurality of chirps, each chirp being limited in time between an initial instant at which the signal has an initial instantaneous frequency and a final instant at which the signal has a final instantaneous frequency, whereby the modulator can generate base chirps, in which the frequency changes monotonically from the initial instantaneous frequency to the final instantaneous frequency according to a predetermined base chirp function, and modulated chirps, whose instantaneous frequency vary according to a plurality of functions that are cyclic shifts of the base chirp function, each frame having a preamble comprising a succession of base chirps and a
payload comprising a set of modulated chirps carrying
the data encoded as cyclic shift, detecting the preamble in the second device,
characterized by, the length of the preamble being longer than an estimated incertitude in the time reference of the second device, determining in the second device phase shifts of chirps in the preamble and assume that the phase shifts encode a position of the corresponding chirp in the preamble according to a predefined encoding, causing the second device to enter a low-power state or a listening state during a period dependent on said position in the preamble, receiving the payload— and demodulating the data in the second device.

14. The method of claim 13, comprising determining in the second device a designation of a network or a data stream to which the data belong based on the phase shifts and deciding whether to continue the reception or not according to the designation.

* * * * *